(No Model.)
T. JAMES.
PACKING.
No. 314,848. Patented Mar. 31, 1885.
Fig. 1.
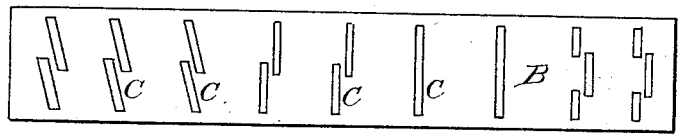
Fig. 2.
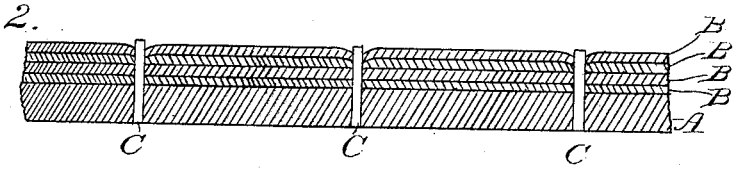
Fig. 3.
Fig. 4.  Fig. 5.  Fig. 6.
 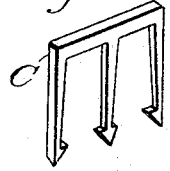 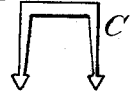
WITNESSES.  INVENTOR
Alex. A. Moore,  Thomas James
Wm Musser by Connolly Bros. and W. Tighe
ATTORNEYS.
N. PETERS, Photo-Lithographer, Washington, D. C.

UNITED STATES PATENT OFFICE.

THOMAS JAMES, OF BRADDOCK, PENNSYLVANIA.

PACKING.

SPECIFICATION forming part of Letters Patent No. 314,848, dated March 31, 1885.

Application filed June 5, 1884. (No model.)

*To all whom it may concern:*

Be it known that I, THOMAS JAMES, of Braddock, in the county of Allegheny and State of Pennsylvania, have invented certain new and useful Improvements in Packing; and I do hereby declare that the following is a full, clear, and exact description of the invention, which will enable others skilled in the art to which it appertains to make and use the same, reference being had to the accompanying drawings, which form a part of this specification.

My invention has relation to packing, and has for its object the provision of a packing which, while possessing all the advantages of a fibrous packing, will be more durable than any of the known varieties of that class of packing.

My invention consists in a fibrous packing provided with pins, barbs, or staples of soft metal which are inserted at intervals into the packing, so as to afford a partial bearing of soft metal for the shaft around which said packing is placed.

My invention still further consists in the combination, with a packing composed of two or more layers of suitable material, of means for fastening the material together comprising barbs, staples, rivets, or equivalent fastening devices made of soft metal.

Referring to the accompanying drawings, wherein Figure 1 is a top view of a section of packing with my improvements attached. Fig. 2 is a longitudinal, and Fig. 3 a transverse, section of the same; and Figs. 4, 5, and 6 details showing several forms of fastening devices.

A designates the rubber backing usually used in connection with fibrous packing, and B B B B the layers of woven material forming the wearing-surface of the packing. C C C designate the soft-metal pieces, which are inserted into the packing A B at suitable intervals, so as to penetrate into or through the same from the wearing-surface.

In Figs. 4, 5, and 6 I have shown these pieces as staples having barbed prongs, the object of such construction being to facilitate their introduction into the packing and to assist in securing the several layers together. When, however, the packing is not composed of separate layers, or the layers of which it may be composed are fastened together in some other manner, the barbed staples may be dispensed with, and tacks or pins employed in their place, or, if desired, soft-metal rivets of the ordinary formation may be substituted for the barbed staples.

In Fig. 1 of the drawings I have shown staples set into the packing in various ways, and the number and arrangement of these staples or their equivalents may be changed or varied in any desired manner without departing from the spirit of my invention.

The pegs, pins, staples, or whatever equivalent device is used should be of Babbitt metal or any soft metal or alloy suitable for a bearing.

The packing described may be made in sections of any desired size, or in rings, or in any other known or desired manner, and the packing may be made of strips or layers of rubber and cloth, or of cloth impregnated with rubber, or cloth or other fibrous material alone.

When the packing described is in use, the soft-metal pieces wear down with the packing, and the metal of which they are composed becomes spread out over the surface of the packing, thereby increasing its efficiency by lessening its friction upon the shaft around which it is packed. As the metal wears away more slowly than the fibrous material, the packing is rendered more durable than if it were composed of fibrous material alone.

The soft-metal pins or barbs may be applied to any of the well-known fibrous packings by punching suitable holes for its reception.

I am aware that it is not broadly new to provide a packing composed of layers of suitable material with staples or pins of metal passing through the layers and holding them together.

I am also aware that a packing of fibrous material has been provided with a soft-metal band or strip surrounding or encircling the same; hence I do not claim as my invention either a fibrous packing the layers of which are held together by metal pins or staples, nor a fibrous packing combined with soft metal applied as an expedient to bind or encircle the packing material.

Having fully described my invention, I claim—

1. As a new article, a fibrous packing material having inserted at intervals in its wearing-surface pieces of metal so soft as to be easily spread out over the fibrous material by the wearing action of the journal and possessing the quality of lubricating the bearing, substantially as described.

2. A packing composed of layers of fibrous material secured together by soft-metal staples having barbed legs, substantially as described.

In testimony that I claim the foregoing as my own I have hereunto set my signature in presence of two witnesses.

THOMAS JAMES.

Witnesses:
    JOS. B. CONNOLLY,
    LOUIS MOESER.